Patented Nov. 13, 1934

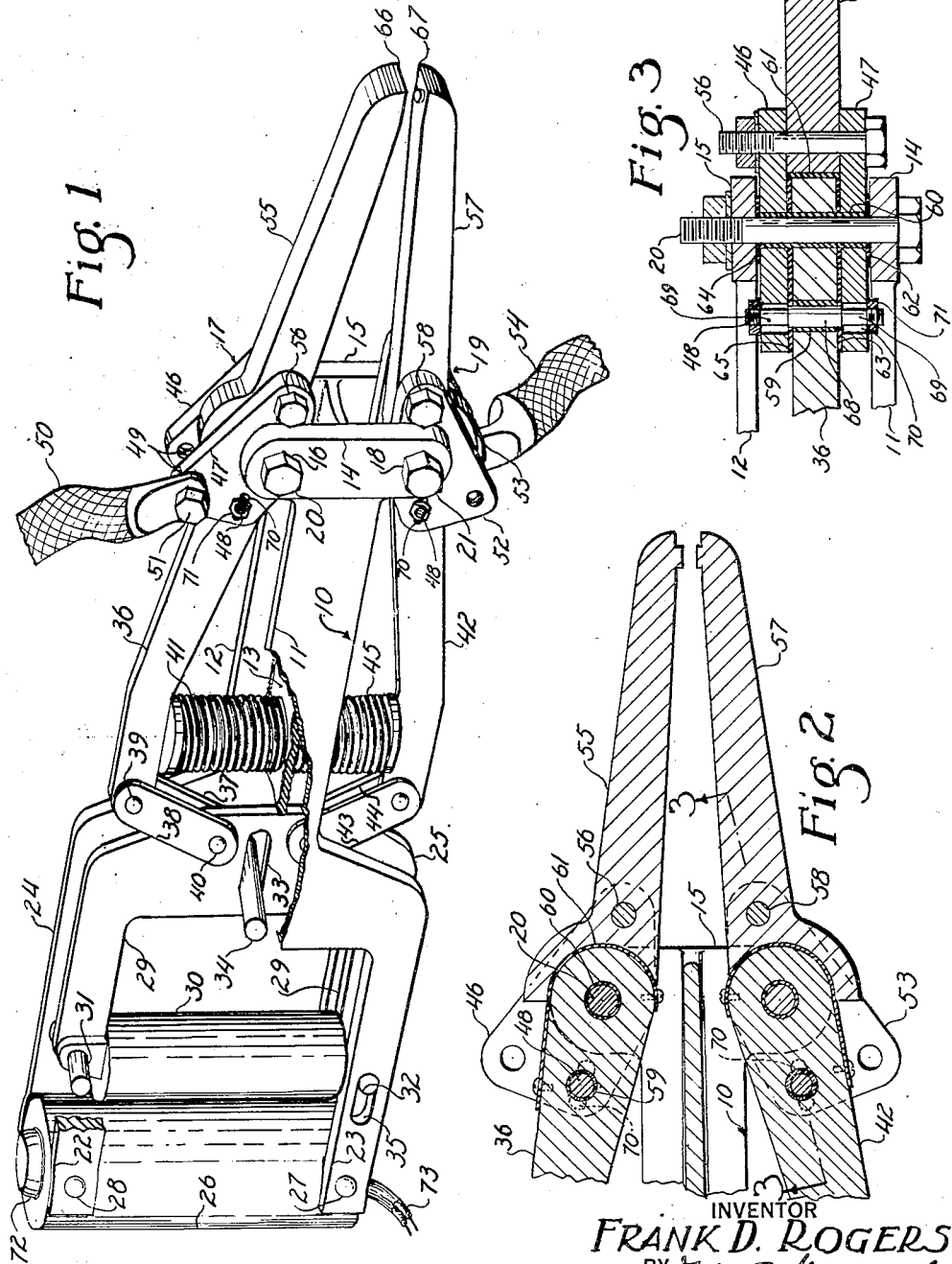

1,980,228

UNITED STATES PATENT OFFICE 1,980,228

WELDING TOOL

Frank D. Rogers, Horsham, Pa., assignor to Keystone Aircraft Corporation, a corporation of Delaware Application August 16, 1932, Serial No. 628,974

9 Claims. (Cl. 219—4)

This invention relates to welding tools, and more particularly to improvements in portable electric resistance welding tongs. The invention is particularly useful in connection with that branch of the electric welding art known as "resistance spot welding." In this process, a pair of electrodes is brought into contact with the opposite sides of a plurality of metal sheets to be joined, and a surge of electric current is passed through the electrodes and through the metal, the intensity of the surge being sufficient to fuse the metal sheets to one another at their point of contact. A homogeneous joint is made between the two sheets of metal; a long joint between the edges of a pair of metal strips may be produced by a succession of spot welds adjacent to each other.

Usually, the apparatus used for spot welding is of a stationary character, the electrical equipment and welding jaws all being mounted in a single unit. The metals to be welded are brought to the machine. In some assembling operations, the parts to be welded are so large and bulky that it is most inconvenient to carry them to such a stationary welding machine. In such a case, a portable spot welding apparatus becomes highly desirable. It is an object of my invention to provide a portable spot welding tool which may be easily transported and manipulated by a single operator. The surges of current may be supplied from a stationary or semi-portable apparatus including the necessary electrical devices, and the current is carried to the welding tool by a pair of heavy flexible cables.

Another phase of the spot welding of thin metals involves an accurate control of the pressure of the electrodes upon the work to be welded. The pressure must be sufficient to establish a firm electrical contact, as the order of current usually used in such processes is extremely high, ranging from several hundred to several thousand amperes. When the current is passed through the electrodes and through the metal to be welded, the resistance of the metal to the passage of current causes it to raise in temperature to its melting point. Upon fusing of the metal, the weld is effected. The electrodes must be so governed that their pressure upon the metal is not of such magnitude that they will press through the fused metal and possibly contact with each other. Control of this phase of the welding is effected in my invention by resilient means which urge the electrodes toward each other under a uniform pressure, this pressure being adjustable initially to effect firm contact and to permit only slight deformation of the metal sheets when the metal at the point of the weld is in a fused condition.

Another object of my invention is to provide a portable spot welding tool which allows proper electrical contact with and prevents excessive deformation of the metal, such condition being maintainable uniformly for successive welds.

A further object of my invention is to provide a welding tool which permits the attachment thereto of a variety of differently shaped electrodes, in order that the tool may be used for different sizes of welds, and in order that the tool may be accommodated to a variety of forms of structures for welding on assembly.

The welding tool comprises a frame to which is pivoted a pair of interchangeable electrodes for contact with the work. Movement of the electrodes is controlled by a handle at the opposite end of the frame, this handle working through a set of toggle links and operating arms connected to the electrodes. The electrodes are normally held in contact with each other by means of a pair of springs resiliently urging them toward contact. Operation of the handle serves to separate the electrodes, while release of the handle permits the electrodes to come in contact, the springs serving to urge the electrodes toward uniform contact for properly effecting a weld.

Further objects will be apparent from a reading of the subjoined specification and drawing, in which:

Fig. 1 is a perspective view of the welding tool, partly broken away to show its construction;

Fig. 2 is a sectional elevation of the electrode end of the tool; and

Fig. 3 is a sectional plan of a portion of the tool designated by the lines 3—3 of Fig. 2.

The welding tool comprises a frame member 10 of I-beam section. The main portion of the I-beam comprises a lateral flange 11 on one side, and a lateral flange 12 on the other side of the frame. A central web portion 13 joins the two flanges. The flanges 11 and 12 at one end of the frame 10 are enlarged to form bosses 14 and 15 on the flanges 11 and 12, respectively. Openings are formed parallel to the web 13 and transversely of the I-beam through the bosses 14 and 15, openings 16 and 17 being formed on one side of the web 13 and openings 18 and 19 being formed on the other side of the web 13. These openings carry pivot members 20 and 21, respectively, the pivot 20 passing through the openings 16 and 17 and the pivot 21 passing through the openings 18 and 19.

Toward the rearward end of the frame 10, the flange 11 is extended beyond the web 13, and is bifurcated to form a fork having an upper member 22 and a lower member 23. The flange 12 is similarly extended to form fork members 24 and 25. At the rearward end of the rectangle formed by the members 22, 23, 24 and 25, a handle 26 is attached as by rivets 27 and 28.

Between the planes of the I-beam flanges 11 and 12, and embraced by the members 22, 23, 24 and 25, is a yoke 29 having a handle or grip 30 attached at the open end of the yoke as by pins 31 and 32. A slot 33 is formed at the closed end of the yoke, and a pin 34 passing through the extensions of the flanges 11 and 12 serves to locate the yoke 29 and to permit forward and rearward sliding thereof by the engagement of the pin 34 with the slot 33. The member 23 has formed therein adjacent the handle 26 a slot 35, in which the pin 32 is adapted to slide. The other members 22, 24 and 25 have slots identical with the slot 35 properly alined to support the pins 31 and 32, and to permit complete suspension of the yoke 29 in the frame.

The pivot 20 carries an operating arm 36 extending rearwardly to a point adjacent the yoke 29. A pair of toggle arms 37 and 38 connect the operating arm 36 with the yoke 29 by a pin 39 passing through the toggles and the operating arm 36, and by a pin 40 passing through the toggles and through the yoke 29. A spring 41 is seated between the operating arm 36 and the web 13 for resiliently urging the rearward end of the operating arm away from the frame member. An identical operating arm 42 is mounted upon the pivot 21 and extends rearwardly adjacent the yoke 29. This operating arm is connected by toggles 43 and 44 to the yoke 29. A spring 45 is seated between the arm 42 and the web 13.

It will be seen by the above described arrangement, that by squeezing the handles 26 and 30 together, the yoke 29 is caused to slide rearwardly, to place tension in the toggles 37, 38, 43 and 44, and to pull the operating arms 36 and 42 toward each other against the action of the springs 41 and 45.

Toward the pivot end of the operating arm 36 are attached connector plates 46 and 47. Both of these plates are adapted to surround the pivot 20 and are attached to the operating arm 36 by a pin 48. The pin 48 is provided with a central portion 68 and end portions 69 of smaller diameter than the central portion 68. The end portions 69 are likewise eccentric to the central portion 68. The central portion 68 of the pin 48 engages a circular opening in the operating arm 36, and the end portions 69 of the pin 48 engage oval openings 70 in the connector plates 46 and 47, respectively. By turning the screw 48, the angular position of the operating arm 36 may be adjusted with relation to the connector plates 46 and 47. When a proper adjustment is obtained, the jamb nuts 71 may be tightened. The plates 46 and 47 are likewise provided with openings 49 to either of which may be attached a current supply cable 50 by means of a bolt 51. A similar pair of plates 52 and 53 are attached in an identical manner with the operating arm 42 and provision is likewise made for a cable 54 forming the second conductor for an electrical circuit.

An electrode 55 is arranged to fit over the pivot end of the operating arm 36 and to be bolted between the two connector plates 46 and 47 by means of a bolt 56. By this connection, the electrode 55 may be readily detached from the welding tool by removal of the single bolt 56, but while in place, it will always move with the plates 46 and 47 and with the operating arm 36. A similar electrode 57 is attached in an identical manner between the connector plates 52 and 53 and adjacent the operating arm 42, attachment being made by means of the bolt 58. The description of attachment and detachment of the electrode 55 will apply equally to the electrode 57.

In order to assure continuity of the electrical circuit and to prevent short circuits between the frame of the tool and the electrodes, insulating strips are provided as shown in Figs. 2 and 3. Referring to Fig. 2, the operating arm 36 is insulated from the rivet 48 by an insulating bushing 59 and is likewise insulated from the pivot 20 by the insulating bushing 60. The electrode 55 is insulated from the operating arm 36 by an insulating strip 61 surrounding and attached to the pivot end of the operating arm. Identical insulating provisions are provided between the operating arm 42 and the electrode 57, the description given for the electrode 55 and the operating arm 36 applying equally to the electrode 57 and the operating arm 42. Referring to Fig. 3, an insulating washer 62 is provided between the boss 14 and the connector plate 47. An insulating strip 63 is provided between the connector plate 47 and the operating arm 36. An insulating washer 64 is provided between the boss 15 and the connector plate 46, and an insulating strip 65 is provided between the connector plate 46 and the operating arm 36. Similar insulating washers and strips are provided at the juncture of the electrode 57, the operating arm 42 and the connector plates 52 and 53.

By these insulating washers and strips, electricity may pass from the cable 50 through the connector plate 47 to the electrode 55, through the work which is inserted between the jaw 66 of the electrode 55 and the jaw 67 of the electrode 57, through the electrode 57, through the connector plate 53 and out through the cable 54.

The handle 26 of the welding tool is provided with a conventional form of push button switch, the push button of which is indicated as 72. Wires from this push button switch leave the lower part of the handle 26 as at 73. The usual electrical welding equipment includes a transformer (not shown) having a comparatively high voltage low current primary, and a comparatively low voltage high current secondary. The push button 72 controls the primary circuit of the transformer, while the cables 50 and 54 are attached permanently to the secondary terminals of the transformer.

It will be seen from the drawing and from the description that in the normal attitude of the welding tool, the electrodes 55 and 57 will be maintained in contact by the spreading action of the springs 41 and 45 against the operating arms 36 and 42, respectively. When the operator desires to make a weld, he squeezes the handles 26 and 30 together, causing movement of the operating arms 36 and 42 toward each other and thus causing separation of the electrodes 55 and 57. He adjusts the jaws 66 and 67 to the point at which he wishes to make the weld, then releases pressure upon the handles 26 and 30, thus allowing the jaws 66 and 67 to contact with the metal inserted therebetween. The current may then be applied by pressing the push button 72, actuating the transformer (not shown) and allowing the heavy welding current to pass through the cables 50 and 54 to effect the weld. By again squeezing the handles 26 and 30 together, the jaws 66 and 67 are separated and the tool may be moved to another location where a weld is to be made. When the handles 26 and 30 are released, the jaws 66 and 67 are pressed toward each other by constant pressure effected by the springs 41 and 45. Adjustment of pressure at the jaws 66 and 67 may be effected by turning the pins 48, by changing the springs 41 and 45 or by the insertion of another set of electrodes which may have greater or less distance from their pivot points to their jaws. The contact area of the jaws 66 and 67 may be varied to change the jaw pressure or to alter the size of the spot weld.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

What is claimed is:

1. A portable electric welding tool having a frame, detachable and interchangeable electrodes connected to and movable with respect to said frame for contact with the work, resilient means carried by said tool for urging said electrodes toward contact with the work under substantially uniform and constant pressure, and means for overcoming said resilient means and for separating said electrodes, said means including a pair of handles, and toggles associated with one said handle and said electrodes.

2. In a portable electric welding tool, a frame, a pair of electrodes movable with respect to said frame and resiliently urged toward contact with each other, toggle links associated with said electrodes, a yoke to which said toggle links are connected, and a handle associated with said yoke, for moving said links and separating said electrodes.

3. In combination, in a tool for the electric spot welding of relatively thin metal plates, a pair of electrodes having contact surfaces engageable with the work, resilient means acting on said electrodes for holding them against said work under a substantially constant predeterminate pressure, means for adjusting the degree of pressure imposed by said electrodes against said work, a frame for carrying said electrodes and said resilient means, and a device carried by said frame and connected with said electrodes for overcoming said resilient means and for separating said electrodes from contact with the work.

4. In a welding tool having a pair of electrodes each mounted for swinging about a fixed pivot, an operating lever for each electrode adapted to swing therewith, resilient means for urging said electrodes into contact with work inserted between them, a manually operable device acting on said levers for separating said electrodes, and mechanism for adjusting the angular position of each said lever with respect to its associated electrode for causing changes in the effective pressure of said resilient means in its action on said electrodes while maintaining the same geometric relation of said electrodes with respect to each other.

5. In a portable electric welding tool, a frame, a pair of opposed levers pivoted on said frame and extending therealong, resilient means for urging said levers away from said frame and from each other, detachable electrodes carried by and movable with said levers, said electrodes being so formed as to contact one with the other or with work inserted between them as said levers move away from each other under the influence of said resilient means, a handle carried by said frame, a grip close to and movable with respect to said handle, and means connecting said grip with both said levers for moving said levers toward each other.

6. In a portable electric welding tool, a frame, a pair of opposed levers pivoted on said frame and extending therealong, resilient means for urging said levers away from said frame and from each other, detachable electrodes carried by and movable with said levers, said electrodes being so formed as to contact one with the other or with work inserted between them as said levers move away from each other under the influence of said resilient means, a handle carried by said frame, a grip close to and movable with respect to said handle, and means connecting said grip with both said levers for moving said levers toward each other, said grip being organized for movement toward said handle to effect separation of said electrodes from each other.

7. In a portable electric welding tool, a frame, an electrode pivoted thereto and adapted to be swung into and out of contact with work to be welded, resilient means acting upon said electrode for urging the latter into contact with the work, a handle mounted on said frame, a grip carried by said frame and adapted to be moved toward and away from said handle, and means connecting said grip with said electrode, said means being organized to move said electrode away from the work upon movement of said grip toward said handle.

8. In a portable electric welding tool, a frame, a lever pivoted thereto, an electrode carried by said lever and adapted to extend beyond said frame, said electrode being organized to move into and out of contact with work to be welded upon movement of said lever away from and toward said frame, respectively, means for resiliently urging said electrode into contact with said work, a handle on said frame, a grip carried by said frame and movable with respect to said handle, and a link pivoted to said grip and to said lever, so organized that movement of said grip toward said handle effects movement of said electrode away from said work.

9. A portable electric welding tool comprising a frame having a handle for the manipulation thereof, a pair of electrodes each swingably carried on said frame for movement toward and away from each other, a movable grip carried on said frame adjacent said handle, and connections from said grip to both said electrodes whereby movement of said grip with respect to said handle causes said electrodes to move with respect to said frame and with respect to each other.

FRANK D. ROGERS.